United States Patent
Chae

(10) Patent No.: US 9,910,249 B2
(45) Date of Patent: *Mar. 6, 2018

(54) OPTICAL SYSTEM FOR CAMERA

(71) Applicant: SAMSUNG ELECTRO-MECHANICS CO., LTD., Suwon-Si (KR)

(72) Inventor: Kyu Min Chae, Suwon-Si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/795,856

(22) Filed: Jul. 9, 2015

(65) Prior Publication Data

US 2015/0309288 A1 Oct. 29, 2015

Related U.S. Application Data

(63) Continuation of application No. 14/137,795, filed on Dec. 20, 2013, now abandoned, which is a
(Continued)

(30) Foreign Application Priority Data

Apr. 30, 2012 (KR) .................. 10-2012-0045609

(51) Int. Cl.
*G02B 3/02* (2006.01)
*G02B 13/18* (2006.01)
(Continued)

(52) U.S. Cl.
CPC .......... *G02B 13/0045* (2013.01); *G02B 9/60* (2013.01); *G02B 13/18* (2013.01)

(58) Field of Classification Search
CPC ...... G02B 9/60; G02B 13/0045; G02B 13/18; G02B 3/04
(Continued)

(56) References Cited

U.S. PATENT DOCUMENTS 8,072,695 B1 12/2011 Lee et al.
8,179,615 B1 5/2012 Tang et al.
(Continued)

FOREIGN PATENT DOCUMENTS

KR 10-2013-0106107 A 9/2013

OTHER PUBLICATIONS

U.S. Office Action dated Sep. 25, 2015 in related U.S. Appl. No. 14/473,956 (25 pages).
(Continued)

*Primary Examiner* — Thomas K Pham
*Assistant Examiner* — Nicholas R Pasko
(74) *Attorney, Agent, or Firm* — NSIP Law

(57) ABSTRACT

Disclosed herein is an optical system for a camera. The optical system for a camera includes: a first lens having positive refractive power and a meniscus shape concave toward an image; a second lens having negative refractive power and a shape concave toward the image; a third lens having the positive refractive power and a shape convex toward an object; a fourth lens having the positive refractive power and a shape convex toward the image; and a fifth lens having the negative refractive power, a shape convex toward the object and concave to the image, and one or more inflection point provided on an image surface.

4 Claims, 9 Drawing Sheets

Related U.S. Application Data continuation of application No. 13/802,247, filed on Mar. 13, 2013, now abandoned.

(51) Int. Cl.
  *G02B 13/00* (2006.01)
  *G02B 9/60* (2006.01)

(58) Field of Classification Search
  USPC .......................................... 359/714, 763, 764
  See application file for complete search history.

(56) References Cited

U.S. PATENT DOCUMENTS

| | | | |
|---|---|---|---|
| 8,456,758 | B1 | 6/2013 | Huang et al. |
| 8,736,983 | B2 | 5/2014 | Jo |
| 8,780,465 | B2 * | 7/2014 | Chae ................ G02B 13/0045 359/714 |
| 9,383,554 | B2 * | 7/2016 | Chae ................ G02B 13/0045 |
| 2010/0253829 | A1 | 10/2010 | Shinohara |
| 2011/0013069 | A1 | 1/2011 | Chen |
| 2011/0164327 | A1 * | 7/2011 | Sato .................... G02B 13/004 359/714 |
| 2011/0249346 | A1 * | 10/2011 | Tang ................ G02B 13/0045 359/764 |
| 2011/0310287 | A1 * | 12/2011 | Ohtsu ................ G02B 13/0045 348/340 |
| 2011/0310494 | A1 | 12/2011 | Ise et al. |
| 2012/0021802 | A1 * | 1/2012 | Sano ................ G02B 13/0045 455/556.1 |
| 2012/0087019 | A1 * | 4/2012 | Tang ................ G02B 13/0045 359/714 |
| 2012/0188655 | A1 | 7/2012 | Tsai et al. |
| 2012/0194920 | A1 | 8/2012 | Huang |
| 2013/0050847 | A1 | 2/2013 | Hsu et al. |
| 2013/0114151 | A1 | 5/2013 | Chen et al. |
| 2013/0201568 | A1 | 8/2013 | Tsai et al. |
| 2013/0242411 | A1 | 9/2013 | An et al. |
| 2013/0314803 | A1 | 11/2013 | Huang et al. |
| 2013/0329307 | A1 | 12/2013 | Jung et al. |
| 2014/0139935 | A1 | 5/2014 | Hsieh et al. |

OTHER PUBLICATIONS

U.S. Office Action dated Jun. 10, 2015 in counterpart U.S. Appl. No. 14/473,956 (34 pages).

Korean Office Action dated Aug. 30, 2017 in corresponding Korean Patent Application No. 10-2014-0003272 (4 pages in English and 3 pages in Korean).

* cited by examiner

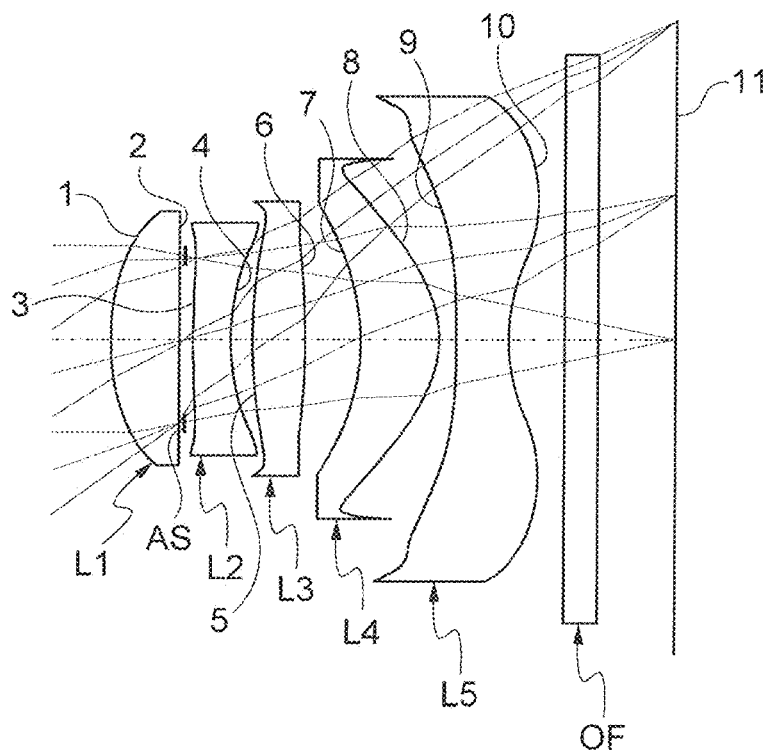
[FIG. 1]

[FIG. 2A]
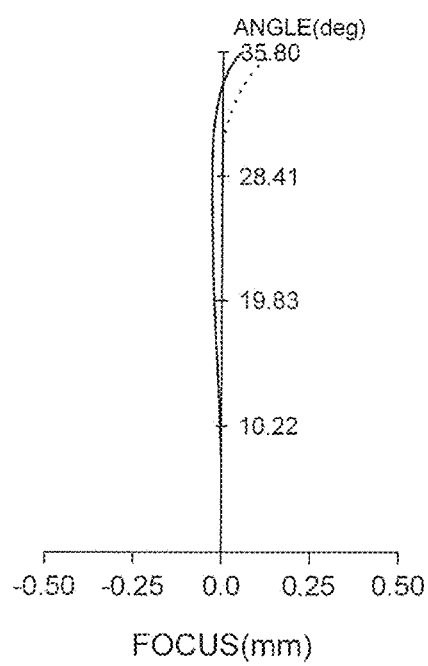
[FIG. 2B]
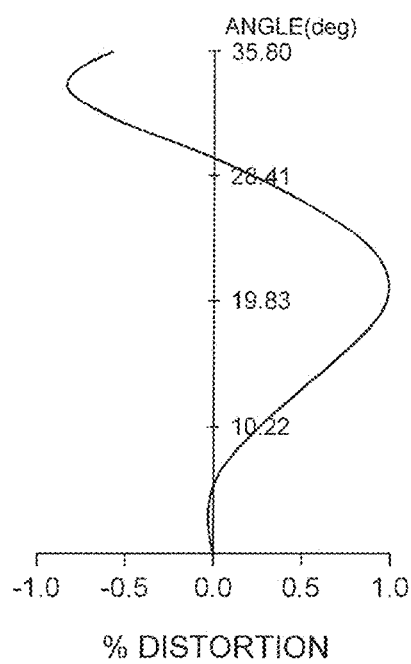

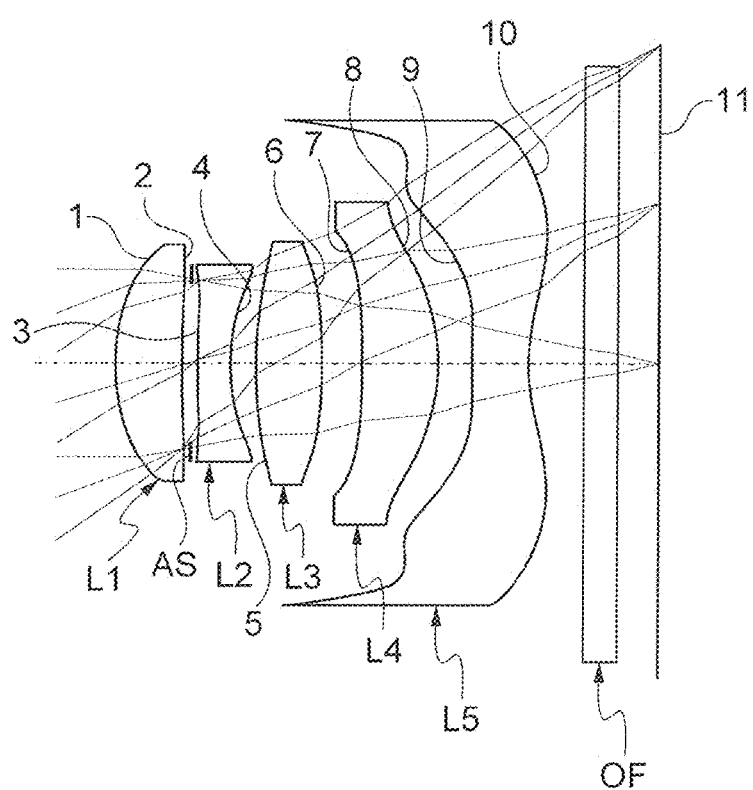

[FIG. 4A]
ASTIGMATISM
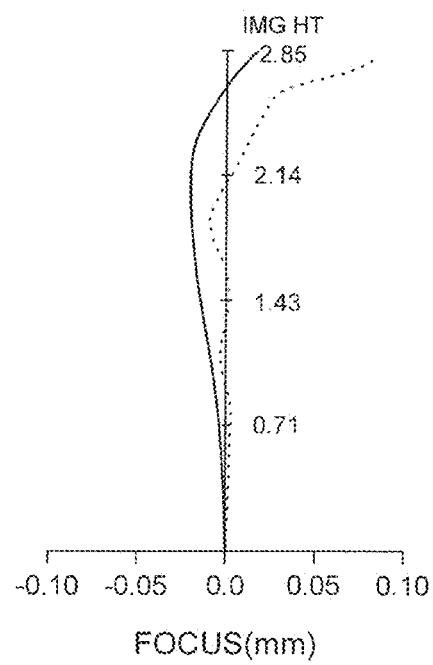
[FIG. 4B]
DISTORTION
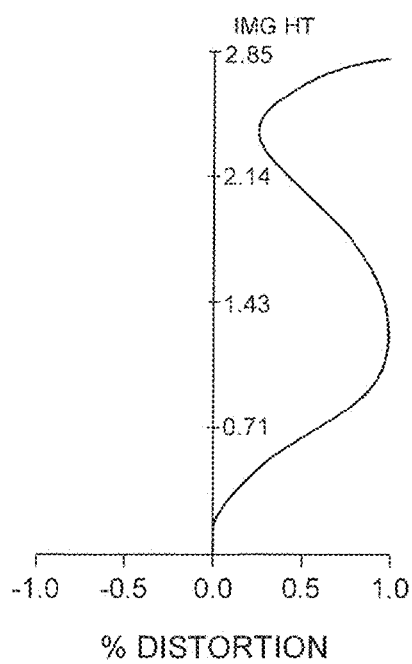

[FIG. 5]
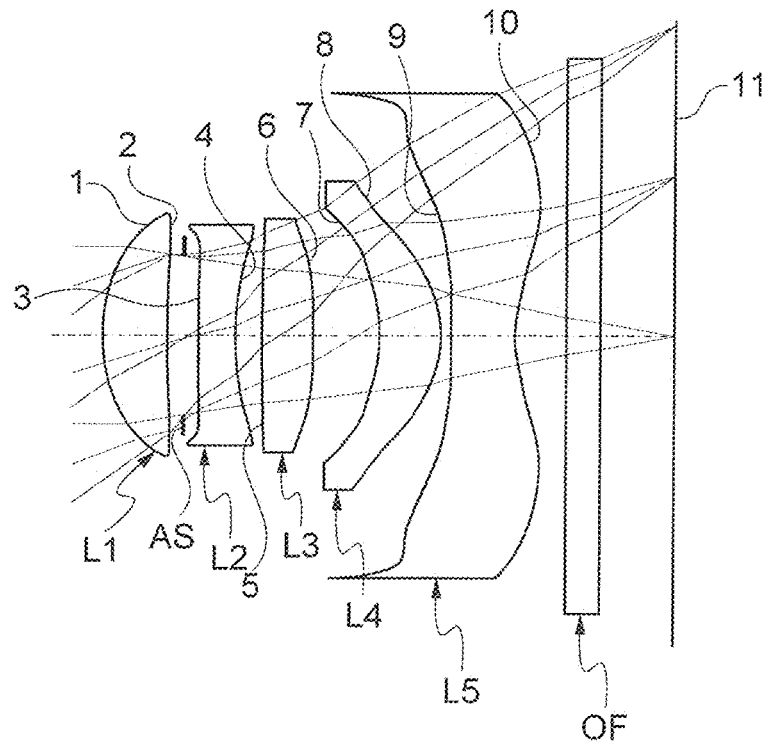
[FIG. 6A]
ASTIGMATISM
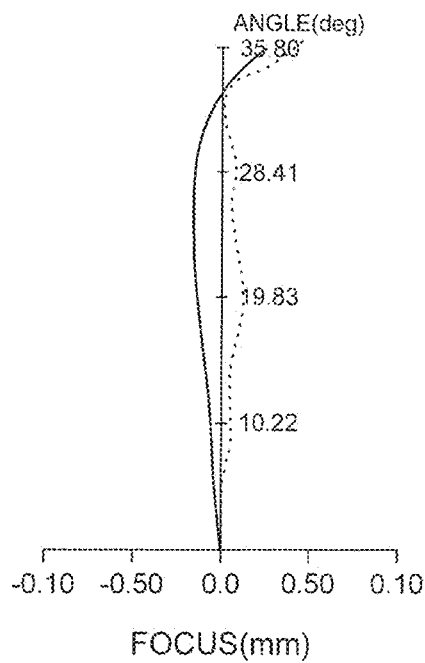

[FIG. 6B]
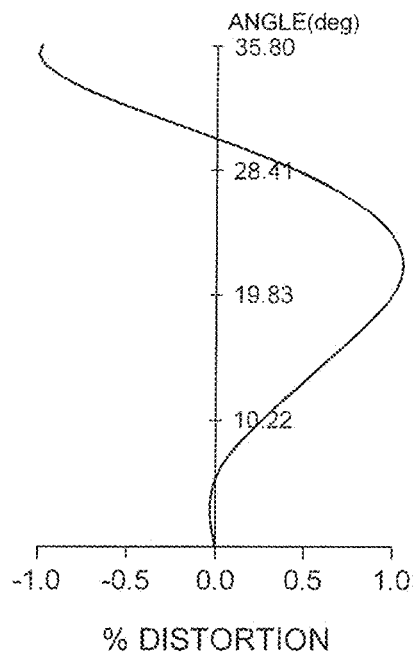
DISTORTION
[FIG. 7]
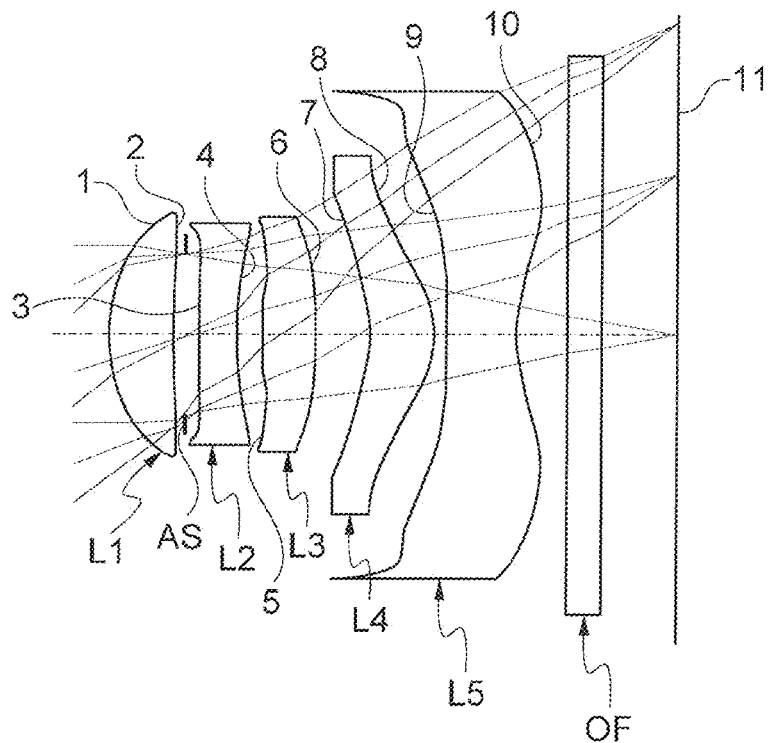

[FIG. 8A]
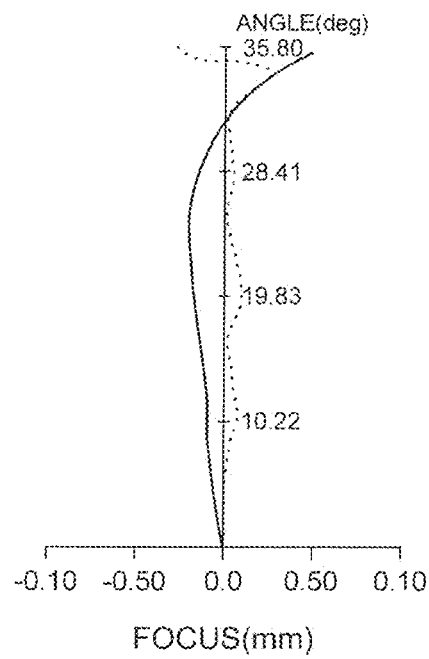
[FIG. 8B]
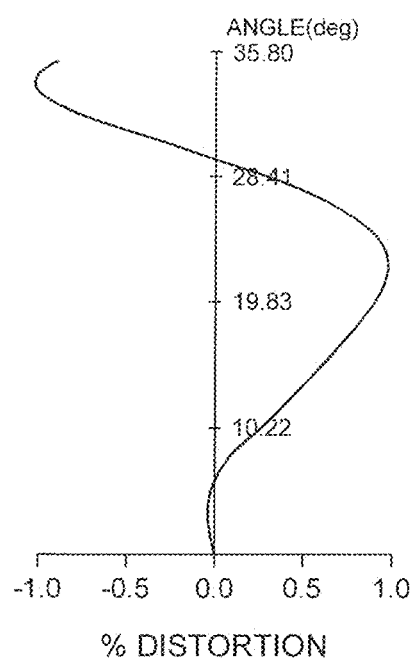

[FIG. 9]
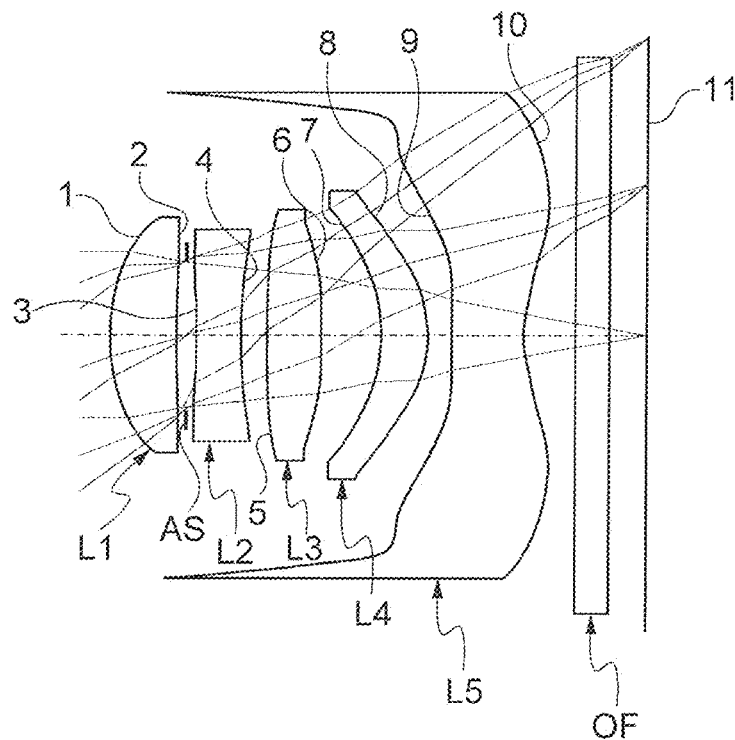
[FIG. 10A]
ASTIGMATISM
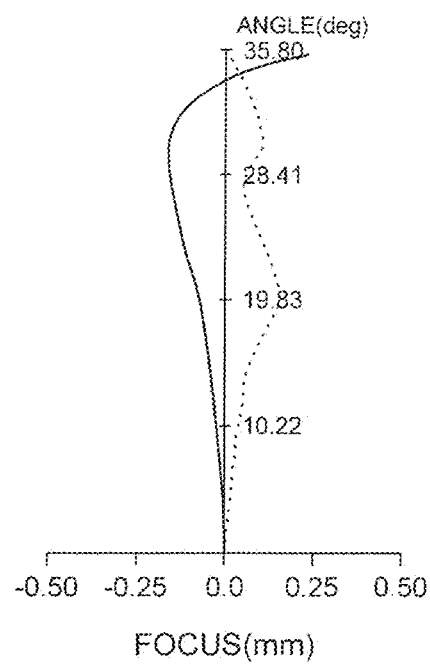

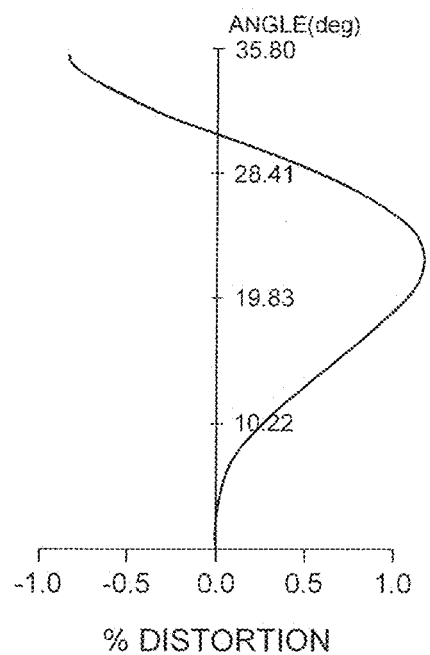

OPTICAL SYSTEM FOR CAMERA

CROSS REFERENCE(S) TO RELATED APPLICATIONS

This application is a continuation of U.S. patent application Ser. No. 14/137,795 filed on Dec. 20, 2013, which is a continuation of U.S. patent application Ser. No. 13/802,247 filed on Mar. 13, 2013, which claims the benefit under 35 U.S.C. Section 119 of Korean Patent Application Serial No. 10-2012-0045609, entitled "Optical System for Camera" filed on Apr. 30, 2012, which are hereby incorporated by reference in their entireties into this application.

BACKGROUND OF THE INVENTION

1. Technical Field

The present invention relates to an optical system for a camera, and more particularly, to an optical system for a camera capable of being manufactured in a small size in order to be mounted in a mobile device and implementing a high resolution.

2. Description of the Related Art

Recently, as the use of a mobile communication unit such as a mobile communication terminal, a personal digital assistant (PDA), and a smart phone increases and a service provided through a communication technology is verified, in addition to a basic communication function, various types of additional functions have been mounted. Among them, the mounting of a camera for simple photographing has been generalized.

Further, recently, in an optical system of a camera used in a mobile device such as a cellular phone, the number of pixels has increased to eight million pixels or more in excess of five million pixels. In addition, a view angle of 70 degrees or more wider than a general view angle of about 60 degrees has been demanded.

However, when a view angle of a lens is increased, an incident angle of a light ray incident to a lens surface cannot but be increased, such that performance deterioration may be intensified even in the same manufacturing tolerance. In addition, as a pixel size of a sensor is decreased, a required spatial frequency is increased, such that an optical system having a high resolution is required.

When the spatial frequency is increased and the resolution is increased, sensitivity to the manufacturing tolerance of the optical system cannot but be increased. Therefore, the development of the optical system having a high resolution and capable of decreasing the sensitivity has been required.

Meanwhile, a high-pixel optical system supporting eight million pixels, which is an optical system for a camera according to the related art, is mainly configured of four sheets of lenses (having a pixel size of 1.4 μm or more), wherein first and second lens of the four sheets of lenses are in charge of the entire refractive power of the optical system, and third and fourth lenses thereof are in charge of image surface field curvature and distortion to correct aberration that is not corrected by the first and second lenses.

In addition, as the first and second lenses, a crown or flint based glass lens is used. Particularly, the second lens has negative refractive power and is made of the flint based glass material to compensate for longitudinal chromatic aberration. However, it is difficult to satisfy conditions such as miniaturization and cost reduction with an optical system design considering a manufacturing cost of an optical system for a mobile camera.

Particularly, due to characteristics of the optical system for a camera applied to the mobile device, a plastic lens is mainly used in consideration of mass production, size, weight, and cost. Therefore, it is difficult to satisfy optical performance and compensate for chromatic aberration with a general optical system design.

RELATED ART DOCUMENT

Patent Document (Patent Document 1) Japanese Patent Laid-Open Publication No. 1997-211320

SUMMARY OF THE INVENTION

An object of the present invention is to provide an optical system for a camera capable of implementing a wide angle and a high resolution by sequentially disposing five sheets of lenses having different longitudinal chromatic aberration characteristics and improving an relative illumination (the ratio of corner illumination to the center) by disposing an aperture stop between first and second lenses.

According to an exemplary embodiment of the present invention, there is provided an optical system for a camera including: a first lens having positive refractive power and a meniscus shape concave toward an image; a second lens having negative refractive power and a shape concave toward the image; a third lens having the positive refractive power and a shape convex toward an object; a fourth lens having the positive refractive power and a shape convex toward the image; and a fifth lens having the negative refractive power, a shape convex toward the object and concave to the image, and one or more inflection point provided on an image surface, wherein the first and second lenses include an aperture stop disposed therebetween in order to block unnecessary light in light passing through the optical system.

The third lens may be configured of a lens having a shape in which both surfaces thereof are convex.

The fourth lens may be configured of a lens having a meniscus shape convex toward the image.

The fifth lens may be configured of a lens having a shape concave toward the object.

The optical system for a camera may further include an optical filter provided between the fifth lens and an image surface, wherein the optical filter is configured of a cover glass coated with an infrared blocking filter for blocking excessive infrared rays included in light introduced from the outside.

The first to fifth lenses may be configured of a plastic lens and have both surfaces configured of an aspherical surface.

The optical system for a camera may satisfy the following Conditional Equations 1 and 2 with respect to a radius of curvature of the third lens and a focal length of the entire optical system, and a focal length of the third lens and a focal length of the entire optical system $$f3/f < 2.0 \qquad \text{[Conditional Equation 1]}$$

$$R31/f < 1.2 \qquad \text{[Conditional Equation 2]}$$

where f3 indicates a focal length of the third lens, R31 indicates a radius of curvature on a surface of the third lens L3 toward the object, and f indicates a focal length of the entire optical system.

BRIEF DESCRIPTION OF THE DRAWINGS

FIG. 1 is a lens configuration diagram showing a lens arrangement of an optical system for a camera according to a first exemplary embodiment of the present invention;

FIGS. 2A and 2B are, respectively, views showing astigmatism and distortion of the optical system shown in Table 1 and FIG. 1;

FIG. 3 is a lens configuration diagram showing a lens arrangement of an optical system for a camera according to a second exemplary embodiment of the present invention; and FIGS. 4A and 4B are, respectively, views showing astigmatism and distortion of the optical system shown in Table 3 and FIG. 3.

FIG. 5 is a lens configuration diagram showing a lens arrangement of an optical system for a camera according to a third exemplary embodiment of the present invention;

FIGS. 6A and 6B are, respectively, views showing astigmatism and distortion of the optical system shown in Table 5 and FIG. 5.

FIG. 7 is a lens configuration diagram showing a lens arrangement of an optical system for a camera according to a fourth exemplary embodiment of the present invention;

FIGS. 8A and 8B are, respectively, views showing astigmatism and distortion of the optical system shown in Table 7 and FIG. 7.

FIG. 9 is a lens configuration diagram showing a lens arrangement of an optical system for a camera according to a fifth exemplary embodiment of the present invention;

FIGS. 10A and 10B are, respectively, views showing astigmatism and distortion of the optical system shown in Table 9 and FIG. 9.

DESCRIPTION OF THE PREFERRED EMBODIMENTS

The acting effects and technical configuration with respect to the objects of an optical system for a camera according to the present invention will be clearly understood by the following description in which exemplary embodiments of the present invention are described with reference to the accompanying drawings.

However, in the lens configuration diagrams according to the following exemplary embodiments, a thickness, a size, and a shape of the lens are slightly exaggerated for a detailed description of the present invention. Particularly, a shape of a spherical surface or an aspherical surface suggested in the lens configuration diagram is only an example. Therefore, the lens is not limited to the above-mentioned shape.

FIG. 1 is a lens configuration diagram of an optical system for a camera according to a first exemplary embodiment of the present invention. As shown in FIG. 1, the optical system for a camera according to the first exemplary embodiment of the present invention may be configured to include a first lens (L1) having a meniscus shape concave toward an image and positive refractive power, a second lens L2 having a shape concave toward the image and negative refractive power, a third lens L3 having a shape convex toward an object and the positive refractive power, a fourth lens L4 having a shape convex toward the image and the positive refractive power, and a fifth lens L5 having a shape convex toward the object and concave toward the image and the negative refractive power, wherein the first to fifth lenses L1 to L5 are sequentially arranged from the object.

Here, the first and second lenses L1 and L2 may include an aperture stop (AS) installed therebetween.

In addition, the optical system for a camera may include an optical filter (OF) provided between the fifth lens L5 and an image surface 11, wherein the optical filter (OF) is configured of an infrared filter for blocking excessive infrared rays in light passing through the optical system or a cover glass coated with the infrared filter.

In the optical system for a camera according to the exemplary embodiment of the present invention, the aperture stop (AS) is disposed at the rear of the first lens L1, that is, between the first and second lenses L1 and L2, thereby making it possible to decrease sensitivity of the first lens L1 to a tolerance. That is, in the case in which the aperture stop (AS) is disposed in front of the first lens L1, an image height is increased due to light incident to the optical system, such that the first lens L1 may become sensitive to decenter. However, when the aperture stop (AS) is disposed between the first and second lenses L1 and L2 as in the exemplary embodiment of the present invention, since an incident angle of light rays incident to the first lens L1 may be decreased, the sensitivity of the first lens L1 to the manufacturing tolerance may be decreased, such that a degree of freedom in design of the optical system may be increased.

In addition, when the aperture stop (AS) is disposed between the first and second lenses L1 and L2, a size of an entrance pupil imaged by the first lens L1 becomes larger toward an edge of the image surface, thereby making it possible to improve an ambient light amount ratio.

Meanwhile, according to the exemplary embodiment of the present invention, since the aperture stop (AS) is disposed between the first and second lenses L1 and L2, an incident angle of the light ray is increased, such that an incident angle at an image surface side of the first lens L1 is significantly increased, thereby making it possible to increase the sensitivity to the manufacturing tolerance. However, the first lens L1 is designed in the shape concave toward the image, thereby making it possible to decrease the incident angle of the light ray to the first lens L1.

However, in the case in which a lens concave toward the image is used as the first lens L1, a chromatic aberration correction function may be weakened. Since the refractive power at the image surface of the lens L1 may be changed into the negative refractive power, the chromatic aberration correction function capable of being removed using a difference in dispersion property by the Abbe's number of the first and second lenses L1 and L2 may be weakened.

Therefore, according to the exemplary embodiment of the present invention, the third lens L3 is formed to be convex toward the object and a relationship between a focal length (f3) of the third lens L3 and a radius of curvature (R31) on a surface of the third lens L3 toward the object is used, thereby making it possible to correct longitudinal chromatic aberration. A more detailed description thereof will be provided through the following Conditional Equations.

Here, the third lens L3 may also be configured of a lens having a shape in which both surfaces thereof are convex.

Further, in the optical system according to the exemplary embodiment of the present invention, the fourth lens L4 may be configured of a lens having a meniscus shape convex toward the image.

In addition, in the optical system according to the exemplary embodiment of the present invention, the fifth lens L5 may be configured of a lens having a shape concave toward the object.

Further, in the optical system according to the exemplary embodiment of the present invention, all of the first to fifth lenses L1 to L5 may be configured of a plastic lens, and any one surface or both surfaces of each of the first and fifth lenses L1 to L5 may be configured of an aspherical surface.

The reason why one or more surface of the lenses configuring the optical system according to the exemplary embodiment of the present invention is configured of the aspherical surface is to minimize the sheet number of lenses capable of implementing a wide view angle, thereby configuring the optical system for a camera that may be compactly manufactured to thereby be used in the mobile device. In addition, the reason why all of the first to fifth lenses L1 to L5 are configured of the plastic lens is to configure the optical system using the plastic lens capable of more easily manufacturing the aspherical surface lens as compared to the glass lens, thereby reducing a manufacturing cost and improving a degree of freedom in design that may alleviate the chromatic aberration correction and the manufacturing tolerance.

Meanwhile, as described above, in the optical system according to the exemplary embodiment of the present invention, the chromatic aberration is corrected by the following Conditional Equations 1 and 2, the acting effect of which will be described below.

$$f3/f<2.0 \quad \text{[Conditional Equation 1]}$$

Where f3 indicates a focal length of the third lens, and f indicates a focal length of the entire optical system.

Conditional Equation 1 indicates a condition regarding the chromatic aberration correction of the optical system. In the case of being out of an upper limit of Conditional Equation 1, focus adjusting positions for each wavelength in the entire optical system become different, such that a phenomenon that a color of a photographed image is blurred may occur.

$$R31/f<1.2 \quad \text{[Conditional Equation 2]}$$

Where R31 indicates a radius of curvature on a surface of the third lens L3 toward the object, and f indicates a focal length of the entire optical system.

Conditional Equation 2 also indicates a condition regarding the chromatic aberration, similar to Conditional Equation 1. When the surface of the first lens L1 toward the image is formed to be concave, the radius of curvature of the third lens L3 is increased, thereby making it possible to correct the chromatic aberration. Here, in the case of being out of an upper limit of Conditional Equation 2, since a back focal length (BFL) for each wavelength of the optical system may be rapidly changed at a portion having a short wavelength, it is difficult to satisfy optical characteristics required in the present invention, that is, correction characteristics of the chromatic aberration.

Meanwhile, an aspherical surface used in the following exemplary embodiments is obtained from the known Equation 1, and 'E used in a Conic constant (K) and aspherical surface coefficients (A, B, C, D, E, and F) and numerals next thereto' indicate the power of 10. For example, E+02 indicates $10^2$, and E-02 indicates $10^{-2}$.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

Where Z indicates a distance from the top of a lens in an optical axis direction, Y indicates a distance in a direction vertical to an optical axis, c indicates a reciprocal number of a radius of curvature (r) at the top of the lens, K indicates a Conic constant, and A, B, C, D, E, and F indicate aspherical surface coefficients.

First Exemplary Embodiment

The following Table 1 shows examples of numerical values according to a first exemplary embodiment of the present invention.

In addition, FIG. 1 is a lens configuration diagram showing a lens arrangement of an optical system for a camera according to a first exemplary embodiment of the present invention; and FIGS. 2A and 2B are, respectively, views showing astigmatism and distortion of the optical system shown in Table 1 and FIG. 1.

In the case of the first exemplary embodiment, an effective focal length (f) of the entire optical system is 4.05 mm. In addition, all of the first to fifth lenses L1 to L5 are configured of an aspherical surface plastic lens.

Further, focal lengths of each lens used in the first exemplary embodiment are as follows: f1=3.66 mm, f2=−3.80 mm, f3=5.09 mm, f4=2.27 mm, and f5=−2.10 mm.

TABLE 1

| Surface No. | Radius of Curvature (R) | Thickness (mm) | Refractive Power (n) | Abbe's Number (v) | Remarks |
|---|---|---|---|---|---|
| *1 | 1.848 | 0.62 | 1.543 | 56.0 | L1 |
| *2 | 23.379 | 0.08 | | | |
| *3 | 6.605 | 0.36 | 1.635 | 23.7 | L2 |
| *4 | 1.729 | 0.18 | | | |
| *5 | 3.287 | 0.48 | 1.543 | 56.0 | L3 |
| *6 | −16.575 | 0.52 | | | |
| *7 | −2.149 | 0.72 | 1.543 | 56.0 | L4 |
| *8 | −0.877 | 0.15 | | | |
| *9 | 50.000 | 0.50 | 1.543 | 56.0 | L5 |
| *10 | 1.114 | 0.50 | | | |
| 11 | ∞ | 0.30 | 1.517 | 64.2 | Optical Filter |
| 12 | ∞ | 0.69 | | | |

In Table 1, a mark * before the surface number indicates an aspherical surface. In the case of the first exemplary embodiment, both surfaces of the first to fifth lenses L1 to L5 are aspherical surfaces.

In addition, values of aspherical surface coefficients of the first exemplary embodiment by Equation 1 are as shown by the following Table 2.

TABLE 2

| Surface No. | K | A | B | C | D | E |
|---|---|---|---|---|---|---|
| 1 | 0.0000 | 0.0084 | −0.0041 | 0.0154 | −0.0025 | — |
| 2 | 0.0000 | −0.0191 | 0.0759 | −0.0445 | — | — |
| 3 | 0.0000 | −0.1486 | 0.2118 | −0.1457 | — | — |
| 4 | 0.0000 | −0.2033 | 0.2187 | −0.1079 | −0.0016 | — |
| 5 | 0.0000 | −0.0914 | 0.0289 | −0.0610 | 0.1737 | −0.0957 |
| 6 | 0.0000 | −0.0232 | −0.0057 | −0.0711 | 0.1253 | −0.0467 |
| 7 | 0.0000 | −0.0983 | −0.0359 | −0.0534 | 0.1083 | −0.0121 |
| 8 | −1.0000 | 0.2995 | −0.5557 | 0.7744 | −0.7865 | 0.5168 |
| 9 | 0.0000 | −0.0941 | −0.0209 | 0.0523 | −0.0267 | 0.0058 |
| 10 | −7.4160 | −0.0918 | 0.0364 | −0.0124 | 0.0029 | −0.0004 |

Second Exemplary Embodiment

The following Table 3 shows examples of numerical values according to a second exemplary embodiment of the present invention.

In addition, FIG. 3 is a lens configuration diagram showing a lens arrangement of an optical system for a camera according to a second exemplary embodiment of the present invention; and FIGS. 4A and 4B are, respectively, views showing astigmatism and distortion of the optical system shown in Table 3 and FIG. 3.

In the case of the second exemplary embodiment, an effective focal length (f) of the entire optical system is 3.94 mm. In addition, all of the first to fifth lenses L1 to L5 are configured of an aspherical surface plastic lens.

Further, focal lengths of each lens used in the second exemplary embodiment are as follows: f1=3.68 mm, f2=−4.63 mm, f3=5.55 mm, f4=3.80 mm, and f5=−2.51 mm.

TABLE 3

| Surface No. | Radius of Curvature (R) | Thickness (mm) | Refractive Power (n) | Abbe's Number (v) | Remarks |
|---|---|---|---|---|---|
| *1 | 1.858 | 0.63 | 1.543 | 56.0 | L1 |
| *2 | 22.800 | 0.08 | | | |
| *3 | 4.089 | 0.32 | 1.635 | 23.7 | L2 |
| *4 | 1.658 | 0.21 | | | |
| *5 | 4.173 | 0.59 | 1.543 | 56.0 | L3 |
| *6 | −10.312 | 0.38 | | | |
| *7 | −6.405 | 0.68 | 1.543 | 56.0 | L4 |
| *8 | −1.621 | 0.31 | | | |
| *9 | 22.423 | 0.50 | 1.543 | 56.0 | L5 |
| *10 | 1.275 | 0.50 | | | |
| 11 | ∞ | 0.30 | 1.517 | 64.2 | Optical Filter |
| 12 | ∞ | 0.69 | | | |

Table 3, a mark * before the surface number indicates an aspherical surface. In the case of the second exemplary embodiment, both surfaces of the first to fifth lenses L1 to L5 are aspherical surfaces.

In addition, values of aspherical surface coefficients of the second exemplary embodiment by Equation 1 are as shown by the following Table 4.

TABLE 4

| Surface No. | K | A | B | C | D | E |
|---|---|---|---|---|---|---|
| 1 | 0.0000 | 0.0084 | −0.0021 | 0.0109 | 0.0057 | — |
| 2 | 0.0000 | −0.0456 | 0.1602 | −0.0994 | — | — |
| 3 | 0.0000 | −0.2037 | 0.3035 | −0.2414 | — | — |
| 4 | 0.0000 | −0.2033 | 0.2528 | −0.1822 | 0.0193 | — |
| 5 | 0.0000 | −0.0538 | 0.0204 | 0.0121 | 0.0318 | −0.0224 |
| 6 | 0.0000 | −0.0377 | −0.1047 | 0.1179 | −0.1157 | 0.0569 |
| 7 | 0.0000 | 0.0272 | −0.1782 | 0.2284 | −0.2547 | 0.1598 |
| 8 | −0.9827 | 0.0372 | −0.0918 | 0.1788 | −0.2169 | 0.1592 |
| 9 | 0.0000 | −0.4123 | 0.2687 | −0.1214 | 0.0383 | −0.0059 |
| 10 | −7.4160 | −0.1583 | 0.0892 | −0.0353 | 0.0085 | −0.0012 |

Third Exemplary Embodiment

The following Table 5 shows examples of numerical values according to a third exemplary embodiment of the present invention.

In addition, FIG. 5 is a lens configuration diagram showing a lens arrangement of an optical system for a camera according to a third exemplary embodiment of the present invention; and FIGS. 6A and 6B are, respectively, views showing astigmatism and distortion of the optical system shown in Table 5 and FIG. 5.

In the case of the third exemplary embodiment, an effective focal length (f) of the entire optical system is 4.10 mm. In addition, all of the first to fifth lenses L1 to L5 are configured of an aspherical surface plastic lens.

Further, focal lengths of each lens used in the third exemplary embodiment are as follows: f1=3.694 mm, f2=−4.620 mm, f3=6.119 mm, f4=2.402 mm, and f5=−2.093 mm.

TABLE 5

| Surface No. | Radius of Curvature (R) | Thickness (mm) | Refractive Power (n) | Abbe's Number (v) | Remarks |
|---|---|---|---|---|---|
| *1 | 1.744 | 0.60 | 1.543 | 56.0 | L1 |
| *2 | 11.367 | 0.03 | | | |
| *3 | 10.729 | 0.35 | 1.635 | 23.7 | L2 |
| *4 | 2.292 | 0.25 | | | |
| *5 | 4.92 | 0.47 | 1.543 | 56.0 | L3 |
| *6 | −10.035 | 0.57 | | | |
| *7 | −2.048 | 0.60 | 1.543 | 56.0 | L4 |
| *8 | −0.882 | 0.08 | | | |
| *9 | 41.338 | 0.60 | 1.543 | 56.0 | L5 |
| *10 | 1.106 | 0.50 | | | |
| 11 | ∞ | 0.30 | 1.517 | 64.2 | Optical Filter |
| 12 | ∞ | 0.70 | | | |

In Table 5, a mark * before the surface number indicates an aspherical surface. In the case of the third exemplary embodiment, both surfaces of the first to fifth lenses L1 to L5 are aspherical surfaces.

In addition, values of aspherical surface coefficients of the third exemplary embodiment by Equation 1 are as shown by the following Table 6.

TABLE 6

| Surface No. | K | A | B | C | D | E |
|---|---|---|---|---|---|---|
| 1 | 0.0000 | 0.0078 | 0.0195 | −0.0113 | −0.0198 | — |
| 2 | 0.0000 | −0.0526 | 0.1366 | −0.0815 | — | — |
| 3 | 0.0000 | −0.1764 | 0.2553 | −0.1908 | — | — |
| 4 | 0.0000 | −0.1762 | 0.2286 | −0.1913 | −0.0599 | — |
| 5 | 0.0000 | −0.1167 | 0.0423 | −0.1200 | 0.1233 | −0.0246 |
| 6 | 0.0000 | −0.0608 | −0.0169 | −0.0400 | 0.0315 | 0.0061 |
| 7 | 0.0000 | −0.0004 | −0.0677 | 0.0671 | −0.1283 | 0.1470 |
| 8 | −1.0000 | 0.3049 | −0.5433 | 0.7642 | −0.7824 | 0.5108 |
| 9 | 0.0000 | −0.0986 | −0.0026 | 0.0286 | −0.0168 | 0.0041 |
| 10 | −7.4160 | −0.0864 | 0.0369 | −0.0131 | 0.0029 | −0.0004 |

Fourth Exemplary Embodiment

The following Table 7 shows examples of numerical values according to a fourth exemplary embodiment of the present invention.

In addition, FIG. 7 is a lens configuration diagram showing a lens arrangement of an optical system for a camera according to a fourth exemplary embodiment of the present invention; and FIGS. 8A and 8B are, respectively, views showing astigmatism and distortion of the optical system shown in Table 7 and FIG. 7.

In the case of the fourth exemplary embodiment, an effective focal length (f) of the entire optical system is 4.10 mm. In addition, all of the first to fifth lenses L1 to L5 are configured of an aspherical surface plastic lens.

Further, focal lengths of each lens used in the fourth exemplary embodiment are as follows: f1=3.959 mm, f2=−4.925 mm, f3=5.542 mm, f4=2.763 mm, and f5=−2.302 mm.

TABLE 7

| Surface No. | Radius of Curvature (R) | Thickness (mm) | Refractive Power (n) | Abbe's Number (v) | Remarks |
|---|---|---|---|---|---|
| *1 | 1.751 | 0.59 | 1.543 | 56.0 | L1 |
| *2 | 8.133 | 0.03 | | | |
| *3 | 7.962 | 0.35 | 1.635 | 23.7 | L2 |
| *4 | 2.222 | 0.25 | | | |
| *5 | 4.185 | 0.47 | 1.543 | 56.0 | L3 |
| *6 | −10.466 | 0.51 | | | |
| *7 | −2.102 | 0.60 | 1.543 | 56.0 | L4 |
| *8 | −0.966 | 0.10 | | | |
| *9 | 50.000 | 0.66 | 1.543 | 56.0 | L5 |
| *10 | 1.219 | 0.50 | | | |
| 11 | ∞ | 0.30 | 1.517 | 64.2 | Optical Filter |
| 12 | ∞ | 0.68 | | | |

In Table 7, a mark * before the surface number indicates an aspherical surface. In the case of the fourth exemplary embodiment, both surfaces of the first to fifth lenses L1 to L5 are aspherical surfaces.

In addition, values of aspherical surface coefficients of the fourth exemplary embodiment by Equation 1 are as shown by the following Table 8.

TABLE 8

| Surface No. | K | A | B | C | D | E |
|---|---|---|---|---|---|---|
| 1 | 0.0000 | 0.0071 | 0.0183 | −0.0097 | −0.0185 | — |
| 2 | 0.0000 | −0.0854 | 0.1565 | −0.0880 | — | — |
| 3 | 0.0000 | −0.2336 | 0.2973 | −0.1993 | — | — |
| 4 | 0.0000 | −0.2176 | 0.2534 | −0.2119 | 0.0661 | — |
| 5 | 0.0000 | −0.1155 | −0.0049 | −0.0484 | −0.0346 | 0.0635 |
| 6 | 0.0000 | −0.0457 | −0.0487 | 0.0103 | −0.0496 | 0.0423 |
| 7 | 0.0000 | −0.0409 | −0.1167 | 0.2662 | −0.2476 | 0.1189 |
| 8 | −1.0000 | 0.1786 | −0.2042 | 0.2245 | −0.0938 | 0.0126 |
| 9 | 0.0000 | −0.1691 | 0.1144 | −0.0458 | 0.0083 | 0.0001 |
| 10 | −7.4160 | −0.0995 | 0.0546 | −0.0231 | 0.0062 | −0.0010 |

Fifth Exemplary Embodiment

The following Table 9 shows examples of numerical values according to a fifth exemplary embodiment of the present invention.

In addition, FIG. 9 is a lens configuration diagram showing a lens arrangement of an optical system for a camera according to a fifth exemplary embodiment of the present invention; and FIGS. 10A and 10B are, respectively, views showing astigmatism and distortion of the optical system shown in Table 9 and FIG. 9.

In the case of the fifth exemplary embodiment, an effective focal length (f) of the entire optical system is 4.16 mm. In addition, all of the first to fifth lenses L1 to L5 are configured of an aspherical surface plastic lens.

Further, focal lengths of each lens used in the fifth exemplary embodiment are as follows: f1=3.749 mm, f2=−4.198 mm, f3=4.042 mm, f4=4.365 mm, and f5=−2.505 mm.

TABLE 9

| Surface No. | Radius of Curvature (R) | Thickness (mm) | Refractive Power (n) | Abbe's Number (v) | Remarks |
|---|---|---|---|---|---|
| *1 | 1.938 | 0.62 | 1.543 | 56.0 | L1 |
| *2 | 32.755 | 0.08 | | | |
| *3 | −19.728 | 0.45 | 1.635 | 23.7 | L2 |
| *4 | 3.145 | 0.22 | | | |
| *5 | 4.193 | 0.56 | 1.543 | 56.0 | L3 |
| *6 | −4.434 | 0.58 | | | |
| *7 | −1.639 | 0.47 | 1.543 | 56.0 | L4 |
| *8 | −1.069 | 0.23 | | | |
| *9 | 44.872 | 0.70 | 1.543 | 56.0 | L5 |
| *10 | 1.319 | 0.50 | | | |
| 11 | ∞ | 0.30 | 1.517 | 64.2 | Optical Filter |
| 12 | ∞ | 0.41 | | | |

In Table 9, a mark * before the surface number indicates an aspherical surface. In the case of the fifth exemplary embodiment, both surfaces of the first to fifth lenses L1 to L5 are aspherical surfaces.

In addition, values of aspherical surface coefficients of the fifth exemplary embodiment by Equation 1 are as shown by the following Table 10.

TABLE 10

| Surface No. | K | A | B | C | D | E |
|---|---|---|---|---|---|---|
| 1 | 0.0000 | 0.0067 | 0.0161 | −0.0043 | −0.0121 | — |
| 2 | 0.0000 | −0.0246 | 0.0876 | −0.0484 | — | — |
| 3 | 0.0000 | −0.1293 | 0.1672 | −0.1329 | — | — |
| 4 | 0.0000 | −0.1654 | 0.1759 | −0.1349 | 0.0344 | — |
| 5 | 0.0000 | −0.0963 | 0.0301 | −0.0059 | 0.0170 | −0.0053 |
| 6 | 0.0000 | −0.0160 | −0.0312 | 0.0119 | 0.0135 | −0.0028 |
| 7 | 0.0000 | 0.0869 | −0.1379 | 0.1153 | −0.0644 | 0.0515 |
| 8 | −1.0000 | 0.1292 | −0.1915 | 0.2507 | −0.2724 | 0.2071 |
| 9 | 0.0000 | −0.1854 | 0.0877 | −0.0323 | 0.0076 | −0.0006 |
| 10 | −7.4160 | −0.0813 | 0.0343 | −0.0112 | 0.0022 | −0.0002 |

Meanwhile, values of Conditional Equations 1 and 2 with respect to the first to fifth exemplary embodiments are as shown in Table 11.

TABLE 11

| Exemplary Embodiment | R31/f | f3/f |
|---|---|---|
| 1 | 0.811 | 1.255 |
| 2 | 1.059 | 1.408 |
| 3 | 1.200 | 1.492 |
| 4 | 1.020 | 1.351 |
| 5 | 1.007 | 0.971 |

As shown in the above Table 1, it may be confirmed that the first to fifth exemplary embodiments of the present invention satisfy Conditional Equations 1 and 2.

As set forth above, in the optical system for a camera according to the exemplary embodiment of the present invention, five sheets of lenses are configured of the aspherical surface plastic lens, thereby making it possible to decrease a manufacturing cost and implement a wide view angle.

In addition, in the optical system for a camera according to the exemplary embodiment of the present invention, the third lens is configured to perform the chromatic aberration correction for the first lens in a state in which five sheets of lenses are disposed, such that the first lens having the shape concave toward the image is used to alleviate the sensitivity to the manufacturing tolerance, thereby making it possible to improve a degree of freedom in design.

Further, in the optical system for a camera according to the exemplary embodiment of the present invention, the aperture stop is disposed between the first and second lenses, thereby making it possible to alleviate the sensitivity to the manufacturing tolerance of the first lens and improve the ambient light amount ratio.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:
1. An optical system, comprising:
   a first lens having positive refractive power and comprising a meniscus shape being convex toward an object side;
   a second lens having negative refractive power and comprising a concave object-side surface toward the object side and a concave image-side surface toward an image side;

a third lens having a convex object-side surface toward the object side and a convex image-side surface toward the image side;

a fourth lens having positive refractive power; and a fifth lens having negative refractive power and comprising:

an image-side surface being concave in the center toward the image side and convex at the periphery toward the image side, and having at least one inflection point thereon, wherein: the first lens, the second lens, the third lens, the fourth lens and the fifth lens are arranged in order from the object side to the image side, and the meniscus shape of the first lens, the concave surfaces of the second lens and the convex surfaces of the third lens are arranged on an optical axis, and wherein among the first to fifth lenses, the fifth lens has a smallest absolute value of a focal length.

2. An optical system, comprising a first lens having positive refractive power and being concave toward an image side;

a second lens having negative refractive power and comprising a concave object side surface toward an object side and a concave image-side surface toward the image side;

a third lens having a convex object-side surface toward the object side and a convex image-side surface toward the image side;

a fourth lens having positive refractive power; and a fifth lens having negative refractive power, of which an image-side surface is concave toward the image side, the fifth lens having at least one inflection point on the image-side surface, wherein the first lens, the second lens, the third lens, the fourth lens and the fifth lens are arranged in order from the object side to the image side, and wherein among the first to fifth lenses, the fifth lens has a smallest absolute value of a focal length.

3. The optical system of claim 2, wherein: the first lens is convex toward the object side, and has a meniscus shape, and the fifth lens comprises the image side surface being concave in the center and convex at the periphery.

4. The optical system of claim 3, wherein each surface of the first, second, third, fourth and fifth lenses comprises an aspherical surface, and the first, second, third, fourth and fifth lenses are made of plastic.

* * * * *